United States Patent [19]

Schmidt et al.

[11] Patent Number: 4,901,828

[45] Date of Patent: Feb. 20, 1990

[54] METHOD AND APPARATUS FOR CONTROLLING DISPLACEMENT OF A PISTON IN A SHOCK ABSORBER

[75] Inventors: Robert J. Schmidt, Toledo, Ohio; Jerome J. Zawada, Jr., Crestwood, Ill.

[73] Assignee: Monroe Auto Equipment Company, Monroe, Mich.

[21] Appl. No.: 361,720

[22] Filed: May 31, 1989

[51] Int. Cl.$^4$ ................................................. F16F 9/48
[52] U.S. Cl. ........................................ 188/288; 16/51; 188/322.15
[58] Field of Search ................... 188/284, 288, 322.15, 188/322.18; 16/51, 52, 66

[56] References Cited

U.S. PATENT DOCUMENTS

| | | |
|---|---|---|
| 1,137,123 | 4/1915 | Fernanzo . |
| 1,141,696 | 6/1915 | Fernanzo . |
| 1,143,753 | 6/1915 | Fernanzo . |
| 1,503,881 | 4/1921 | Bros . |
| 1,845,167 | 2/1932 | McGrew . |
| 1,920,251 | 8/1933 | Gillen . |
| 2,092,259 | 9/1937 | Padgett ...................... 188/322.15 X |
| 2,710,077 | 6/1955 | Fabel et al. ......................... 188/288 |
| 3,062,331 | 11/1962 | Wyman . |
| 3,229,589 | 1/1966 | Langas . |
| 3,771,626 | 11/1973 | Palmer ........................ 188/322.15 X |
| 3,835,753 | 9/1974 | Bunyard . |
| 4,048,905 | 9/1977 | Souslin ............................. 188/284 X |
| 4,113,072 | 9/1978 | Palmer ........................ 188/322.15 X |
| 4,457,498 | 7/1984 | Pauliukonis . |

FOREIGN PATENT DOCUMENTS

| | | | |
|---|---|---|---|
| 204342 | 12/1982 | Japan ................................... 188/288 |
| 22044 | 11/1914 | United Kingdom ........... 188/322.18 |
| 653286 | 5/1951 | United Kingdom ................ 188/284 |
| 1194140 | 6/1970 | United Kingdom .................... 16/52 |
| 1305311 | 1/1973 | United Kingdom ................ 188/284 |

Primary Examiner—George E. A. Halvosa
Attorney, Agent, or Firm—Harness, Dickey, Pierce

[57] ABSTRACT

A shock absorber for damping the movement of the body of an automobile is provided. The shock absorber comprises a pressure cylinder forming a working chamber operable to store damping fluid. The shock absorber further comprises a reciprocating piston disposed in the working chamber operable to divide the working chamber into first and second portions. An axially extending piston rod is disposed within the working chamber and is connected to the piston. Finally, the shock absorber includes an annular collar and a split ring for controlling the displacement of the piston.

9 Claims, 5 Drawing Sheets

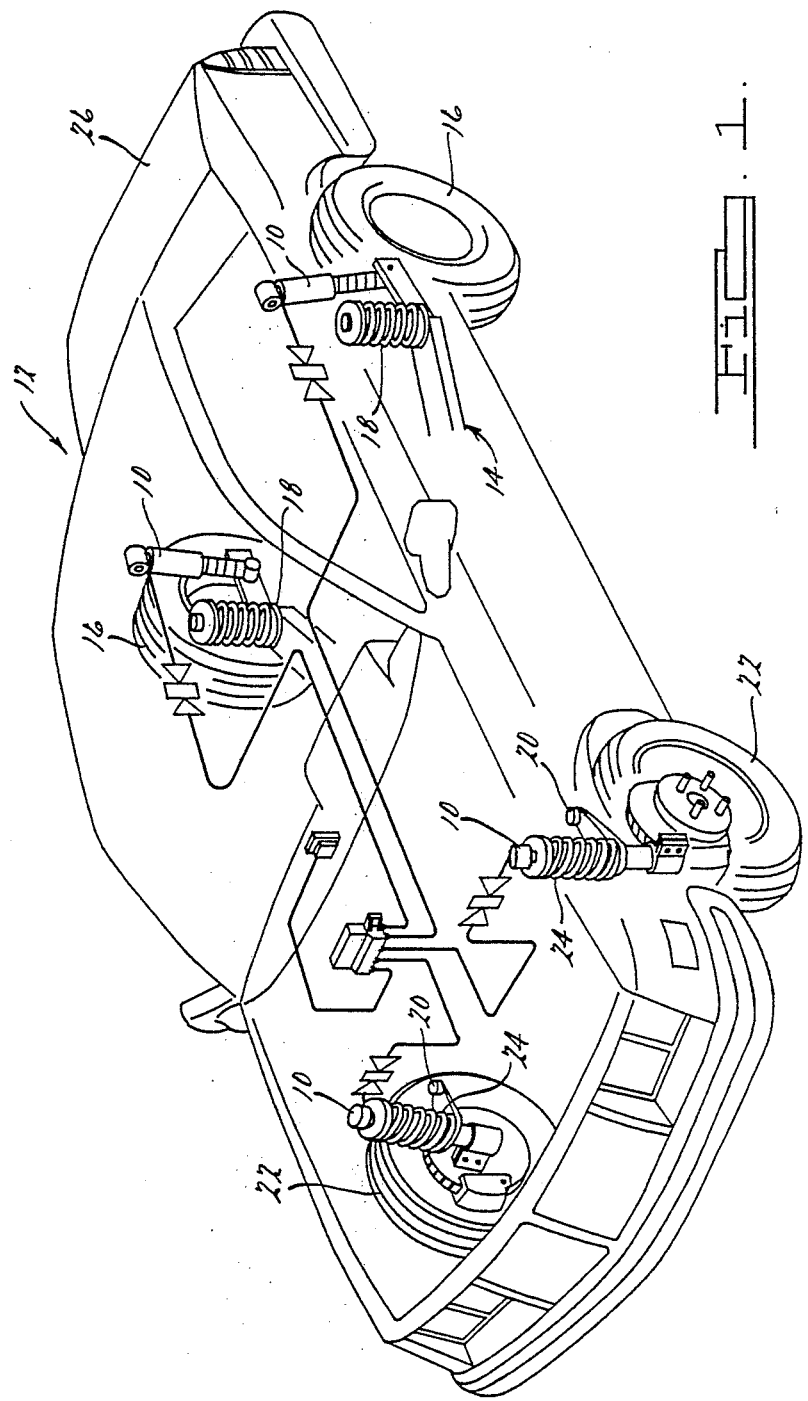

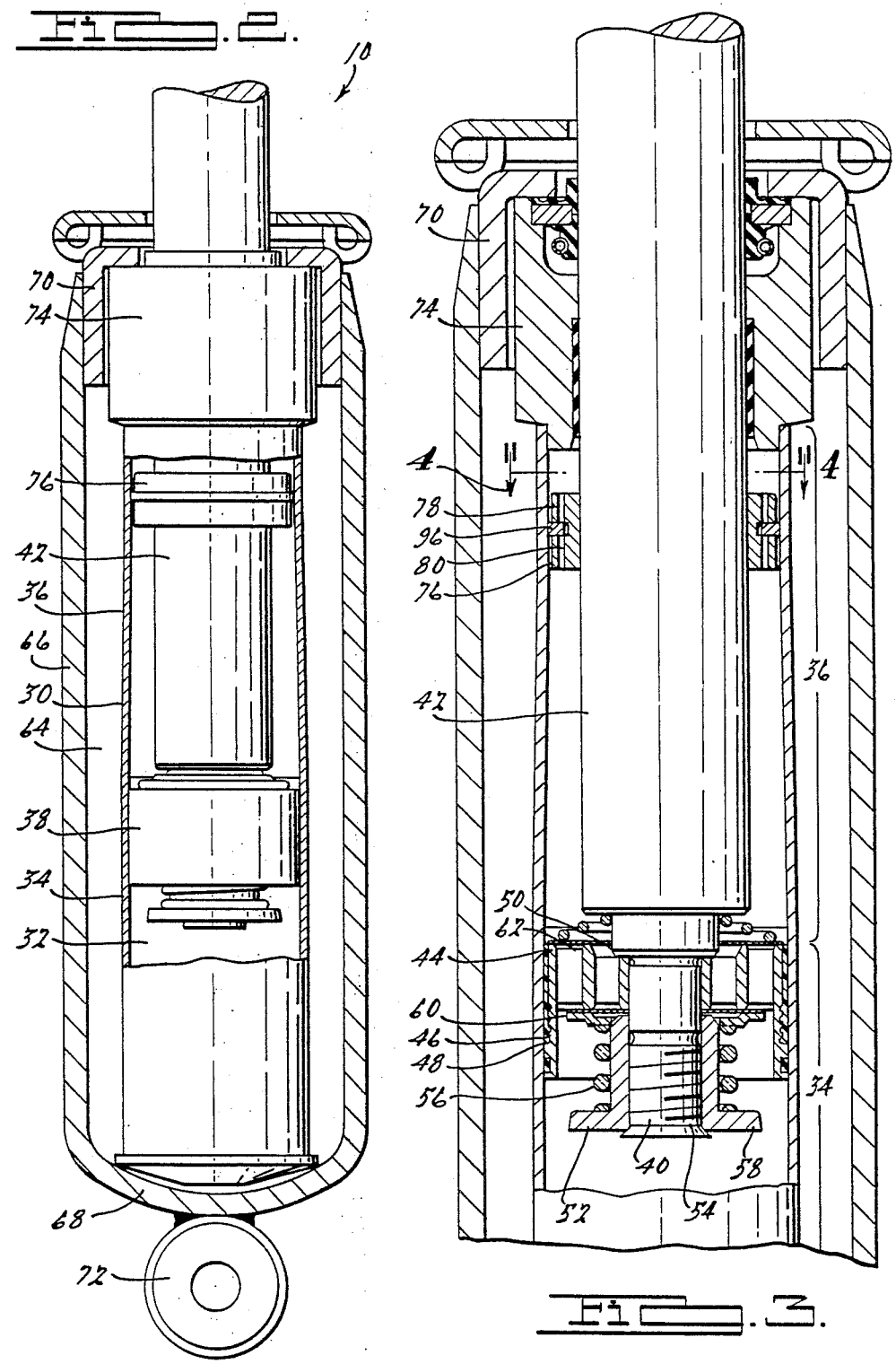

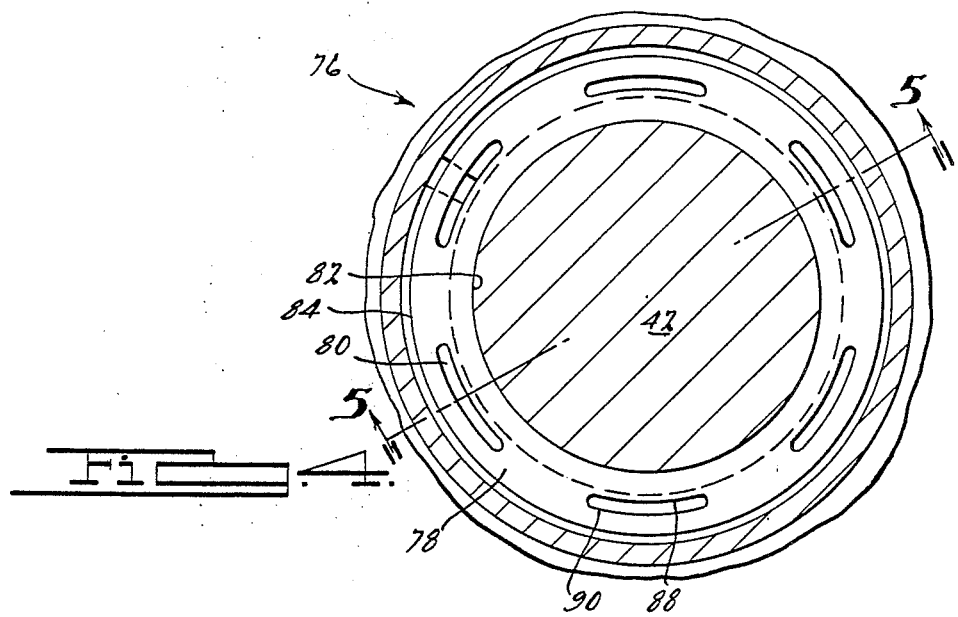
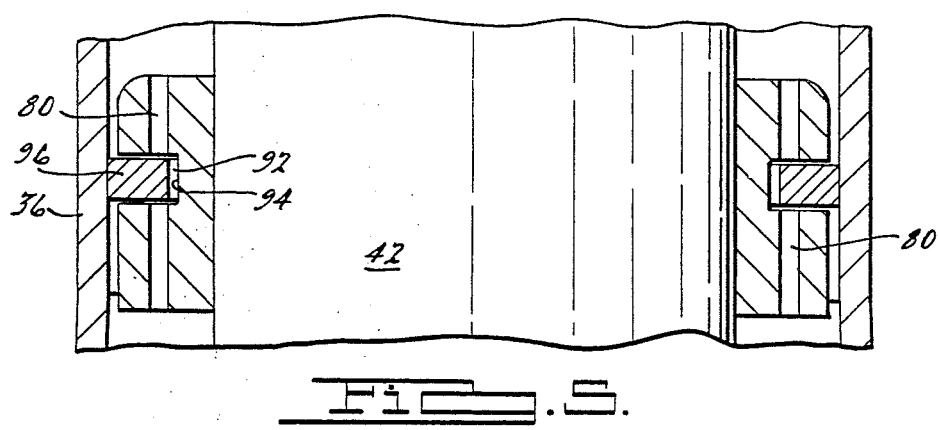
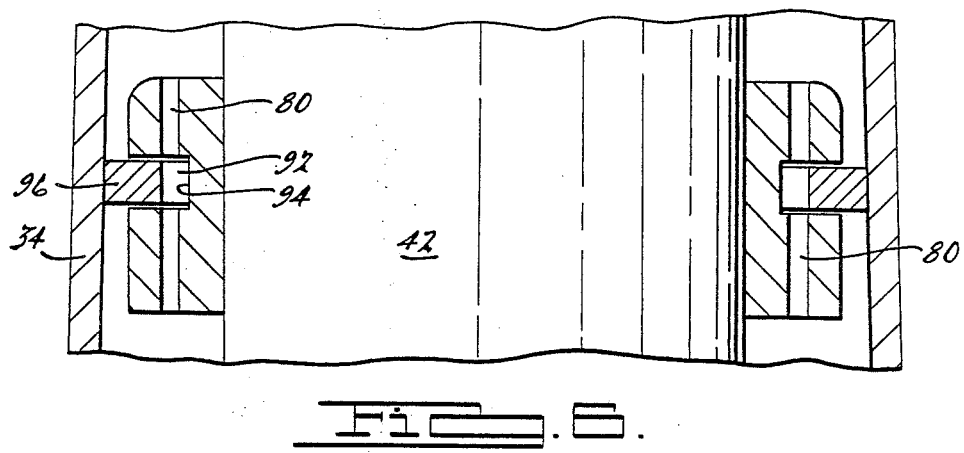

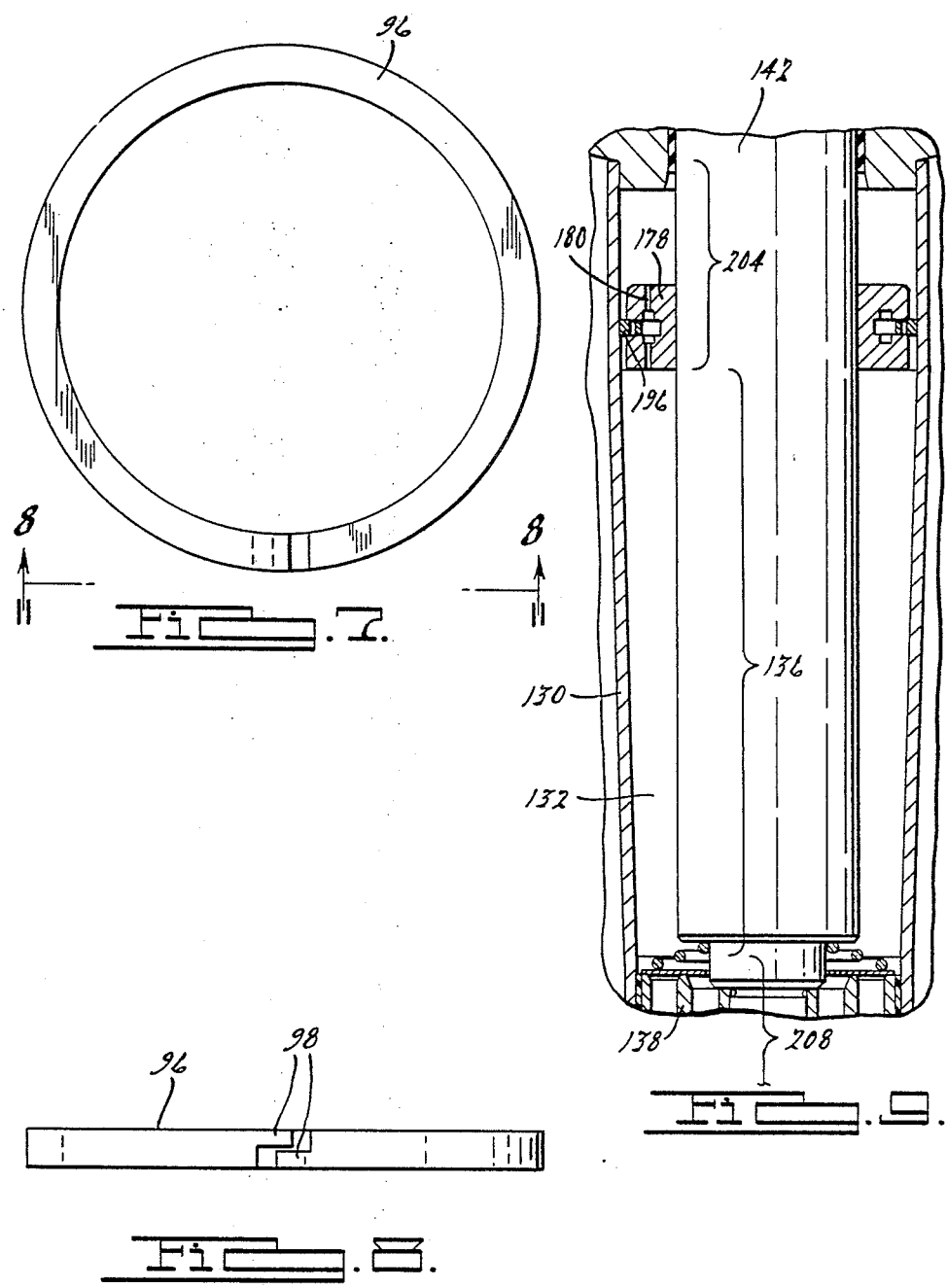

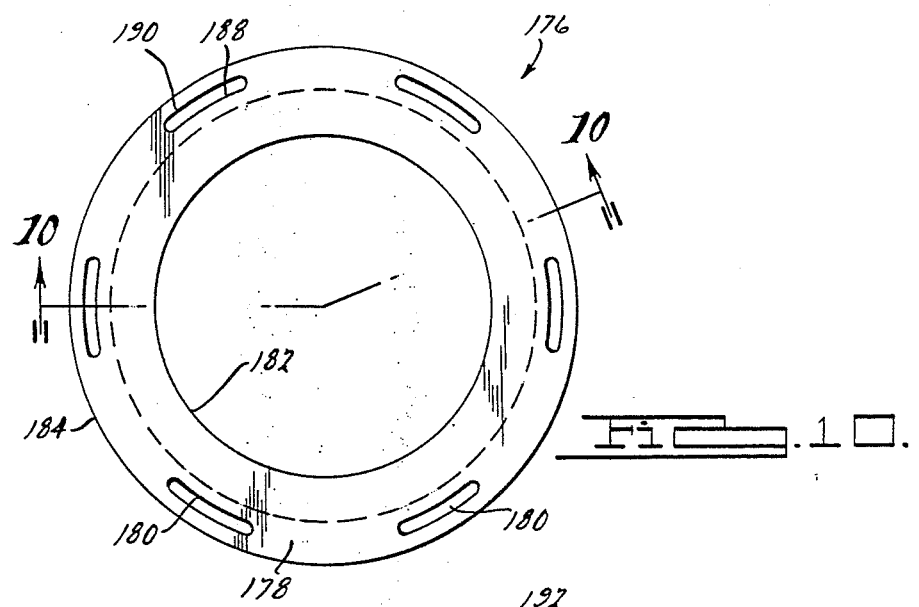
FIG. 10.
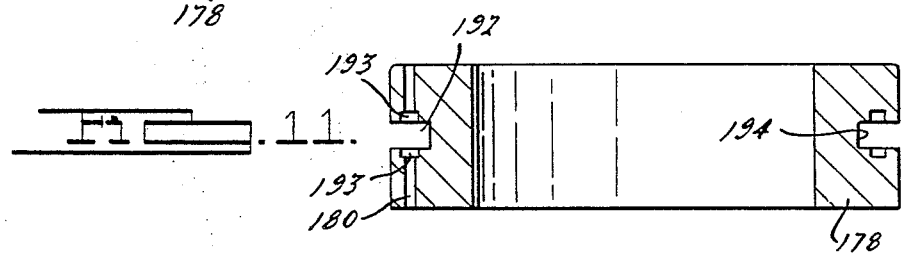
FIG. 11.
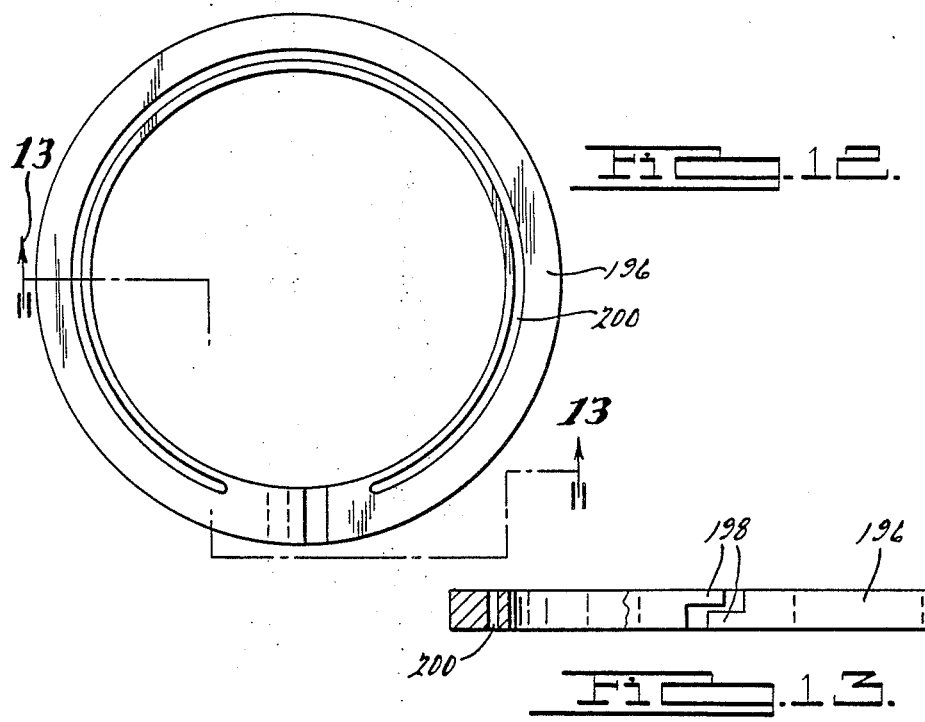
FIG. 12.
FIG. 13.

METHOD AND APPARATUS FOR CONTROLLING DISPLACEMENT OF A PISTON IN A SHOCK ABSORBER

This is a continuation of application Ser. No. 170,821, filed Mar. 21, 1988, now abandoned.

BACKGROUND OF THE INVENTION

1. Field of the Invention

This invention relates to automotive suspension systems, and more particularly to a method and apparatus for controlling the displacement of a piston in a shock absorber.

2. Description of Related Art

Shock absorbers are used in connection with automotive suspension systems to absorb unwanted vibrations which occur during driving. To absorb this unwanted vibration, shock absorbers are generally connected between the body and the suspension of the automobile. A piston is located within the shock absorber and is connected to the body of the automobile through a piston rod. Because the piston is able to limit the flow of damping fluid within the working chamber of the shock absorber when the shock absorber is compressed or extended, the shock absorber is able to produce a damping force which counteracts the vibration which would otherwise be transmitted from the suspension of the automobile to the body.

When the wheel to which a shock absorber is associated encounters a steep drop in the road surface such as a pot hole, the piston would rise within the shock absorber housing to a point where the piston would contact the rod guide. Since the damping characteristics of the shock absorber often did not change as the piston approached the guide rod, the piston would often impact the rod guide at relatively high velocity. This high velocity impact of the piston with respect to the rod guide often had two detrimental effects with respect to vehicle cooperation. First, the impact between the piston and the rod guide would often cause ride discomfort as a result of the "jerk" that would be felt by the passengers when the piston encountered the rod guide. Further, the relatively high velocity impact of the piston with respect to the rod guide also increased the possibility that damage to the piston would occur which would require replacement of the shock absorber.

SUMMARY OF THE INVENTION

Accordingly, it is the primary objection of the present invention to provide a method and apparatus for controlling the displacement of a piston in a shock absorber.

It is another object of the present invention to provide a method and apparatus for controlling the displacement of a piston in which excessive movement of the piston is minimized.

A further object of the present invention is to provide a method and apparatus for controlling the displacement of a piston in which the damping forces opposing excessive displacement of the piston increases with increasing piston displacement.

Another object of the present invention is to provide a method and apparatus for controlling the displacement of a piston in which the potential for damage to the piston due to excessive displacement of the piston is reduced.

A further object of the present invention is to provide a method and apparatus for controlling the displacement of a piston in which ride discomfort caused by the impact between the piston and the rod guide is reduced.

BRIEF DESCRIPTION OF THE DRAWINGS

Various advantages of the present invention will become apparent to one skilled in the art upon reading the following specification and by reference to the following drawings in which:

FIG. 1 is an illustration of an automobile using the method and apparatus for controlling displacement of a piston according to the teachings of the preferred embodiments of the present invention;

FIG. 2 is a reduced side elevational view, partially broken away, of a shock absorber using the apparatus for controlling displacement of a piston according to the teachings of the preferred embodiments of the present invention;

FIG. 3 is an enlarged elevational view of a shock absorber using the apparatus for controlling displacement of a piston shown in FIG. 2 according to the first preferred embodiment of the present invention;

FIG. 4 is a view of the apparatus for controlling displacement of a piston according to the first preferred embodiment of the present invention taken in the direction of line 4—4 in FIG. 3;

FIG. 5 is a side elevational view of the apparatus for controlling displacement of a piston according to the first preferred embodiment of the present invention taken in the direction of line 5—5 of FIG. 4 when the apparatus is at the upper portion of the pressure chamber;

FIG. 6 is a side elevational view of the apparatus for controlling displacement of a piston according to the first preferred embodiment shown in FIG. 5 when the apparatus is near the lower portion of the pressure chamber;

FIG. 7 is a top view of the split ring shown in FIG. 6;

FIG. 8 is a side elevational view of the split ring taken in the direction of line 8—8 in FIG. 7;

FIG. 9 is an enlarged elevational view of a shock absorber using the apparatus for controlling displacement of a piston according to the second preferred embodiment of the present invention;

FIG. 10 is a view of the apparatus for controlling displacement of a piston shown in FIG. 9;

FIG. 11 is a side elevational view of the collar shown in FIG. 10 taken in the direction of line 11—11;

FIG. 12 is a top view of the split ring shown in FIG. 9; and

FIG. 13 is a side elevational view of the split ring shown in FIG. 12 taken in the direction of line 13—13.

DESCRIPTION OF THE PREFERRED EMBODIMENTS

Referring to FIG. 1, a plurality of four shock absorbers 10 in accordance with the preferred embodiment of the present invention are shown. The shock absorbers 10 are depicted in operative association with a diagrammatic representation of a conventional automobile 12. The automobile 12 includes a rear suspension 14 having a transversely extending rear axle association (not shown) adapted to operatively support the vehicle's rear wheels 16. The rear axle assembly is operatively connected to the automobile 12 by means of a pair of shock absorbers 10 as well as the helical coil springs 18. Similarly, the automobile 12 has a front suspension system 20 including a transversely extending front axle assembly (not shown) to operatively support the front wheels 22. The front axle assembly is operatively connected to the automobile 12 by means of a second pair of shock absorbers 10 and by the helical coil springs 24. The shock absorbers 10 serve to dampen the relative movement of the unsprung portion (i.e., the front and rear suspensions 14 and 20) and the spring portion (i.e., the body 26) of the automobile 12. While the automobile 12 has been depicted as a passenger car, the shock absorber 10 may be used with other types of automotive vehicles, snowmobiles, airplanes and damping devices in general as well. Further, the term "shock absorber" as used herein will refer to shock absorbers in the general sense of the phrase and will include MacPherson struts.

With particular reference to FIGS. 2 and 3, the shock absorber 10 according to the preferred embodiments of the present invention is shown. The shock absorber 10 comprises an elongated pressure tube cylinder 30 defining a damping fluid-containing working chamber 32. The pressure cylinder 30 has a straight cylindrical portion 34 and an axially extending and inwardly tapered portion 36. Disposed within the working chamber 32 is a reciprocal piston 38. The reciprocal piston 38 is secured to one end of an axially extending piston post 40 which is is in turn secured to an axially extending piston rod 42.

The piston 38 comprises a housing 44 having a plurality of ridges 46 disposed on the annular exterior of the piston housing 44. The ridges 46 are used to secure an annular teflon sleeve 48 which is disposed between the ridges 46 of the piston housing 44 and the pressure cylinder 30. The teflon sleeve 48 permits movement of the piston 38 with respect to the pressure cylinder 30 without generating undue frictional forces.

Upward movement of the piston 38 is limited by a radially extending step portion 50 of the piston post 40. Downward movement of the piston 38 is limited by a threaded nut 52 or similar type fastening element which is threadably received upon the lower portion 54 of the piston post 40. A helical coil spring 56 is arranged concentrically of the nut 52 and is supported at the lower end thereof by a radially outwardly extending flange 58 on the lower end of the nut 52. The upper end of the spring bears against a spring retainer 60 which in turn acts against the underside of the housing 44 to thereby resiliently urge the piston upward. The piston 38 further includes a valve disk 62 which provides means for controlling the flow of damping fluid between said first and second portions of said working chamber 32. It is to be understood that the piston 38 was described in general terms as the present invention may be used with a wide variety of pistons. One such piston is disclosed in U.S. Pat. No. 4,113,072, which is hereby incorporated by reference.

The shock absorber 10 further comprises a base valve (not shown) located within the lower end of the pressure cylinder 30 and is used to control the flow of damping fluid between the working chamber 32 and an annular fluid reservoir 64. The annular fluid reservoir 64 is defined as the space between the outer periphery of the cylinder 30 and the inner periphery of a reservoir tube or cylinder 66 which is arranged essentially around the exterior of the pressure cylinder 30. The construction in operation of the base valve may be of the type shown and described in U.S. Pat. No. 3,771,626, which is hereby incorporated by reference.

The lower end of the shock absorber 10 is provided with generally cup-shaped end cap 68, while the upper end of the shock absorber 10 includes a generally cup-shaped end cap 70. A suitable end fitting 72 is secured to the lower end of the lower cap 68 for operatively securing the shock absorber 10 between the body and axle assembly of the automobile 12 in a conventional manner. The upper portion (not shown) of the piston rod 42 is attached to the automobile 12 in a conventional manner. Further, a rod guide 74 is disposed at the upper end of the cylinder 30 within the upper end cap 70. The rod guide 74 is used to allow the piston rod 42 to be displaced in a substantially axial direction within the pressure cylinder 30.

According to the first preferred embodiment of the present invention, the apparatus 76 for controlling displacement of the piston 38 comprises an annular collar 78 which is coaxially disposed on the piston rod 42. The annular collar 78 comprises a plurality of axially extending flow passages 80 which are disposed between the inner radial surface 82 of the annular collar 78 and the radially outer surface 84 of the annular collar 78. The flow passages 80 are defined in part by a radially inward surface 88 disposed between the radially inward surface 82 and the radially outward surface 84 of the annular collar 78, as well as the radially outward surface 90 of the flow passages 80 which is also disposed between the radially inward surface 82 and the radially outward surface 84 of the annular collar 78. When the flow passages 80 are not obstructed by the split ring described below, the flow passages 80 permit damping fluid to flow between the region of the working chamber 32 above the annular collar 78 and the portion of the working chamber 32 between the annular collar 78 and the piston 38.

To provide means for accommodating the split ring described below, the annular collar 78 further comprises a groove 92. The groove 92 extending circumferentially around the radially outward surface of the annular collar 78. Further, the groove 92 extends through the radially outward surface 90 of the flow passages 80 as well as through the radially inward surface 88 of the flow passages 80 so as to form a circumferential ring seat 94.

To provide means for closing the flow passages 80 in response to displacement of said annular collar 78, the apparatus 76 further comprises a split ring 96. The split ring 96 is operable to be inserted into the groove 92 and contains end portions 98 which are separated by a gap. When the annular collar 78 is disposed near the bottom of the cylinder 66, the split ring 96 extends radially from the groove 92 to the cylinder 30 to such an extent that the ring 96 does not obstruct the flow of damping fluid through the flow passages 80 as shown in FIG. 6. However, when the collar 78 is adjacent to the rod guide 74 in the inwardly tapered portion 36 of the cylinder 30, the split ring 96 moves inward due to the reduced inside diameter of the tapered portion 36. This inward movement of the split ring 96 obstructs the flow of damping fluid through the flow passages 80. Accordingly, the further up the tapered portion 36 the collar 78 is located, the more inwardly disposed the split ring 96 becomes, thereby obstructing the flow of damping fluid through the flow passages 80 to prevent the flow of damping fluid through the flow passages 80.

During operation, relatively minor extensions of the piston rod 42 do not cause sufficient displacement of the split ring 96 within the groove 92 so as to allow the split ring 96 to block the flow passages 80. Accordingly, the flow between the upper and lower portions of the working chamber 32 is limited solely by the piston 38. During relatively large extensions of the piston rod 42, the collar 78 moves into the tapered portion 36 of the cylinder 30 in which the diameter of the cylinder decreases. As the collar 78 passes upward into region of the tapered portion 36 of increasingly smaller diameter, the split ring 96 moves further radially inward in the groove 92. As this occurs, the split ring 96 begins to interfere with damping fluid flowing through the flow passages 80. When the collar 78 is in the region of the cylinder 30 such that the split ring 96 is displaced to such an extent that it blocks the flow of damping fluid passing through the flow passages 80, further movement of the piston rod 42 is limited substantially to that which is permitted by the compression of the damping fluid between the annular collar 78 and the guide rod 74.

According to the second preferred embodiment of the present invention shown in FIGS. 9-13, the apparatus 176 for controlling displacement of the piston 138 comprises an annular collar 178 which is coaxially disposed on the piston rod 142. The annular collar 178 comprises a plurality of axially extending flow passages 180 which are disposed between the inner radial surface 182 of the annular collar 178 and the radially outer surface 184 of the annular collar 178. The flow passages 180 are defined in part by a radially inward surface 188 disposed between the radially inward surface 182 and the radially outward surface 184 of the annular collar 178, as well as the radially outward surface 190 of the flow passages 180 which is also disposed between the radially inward surface 182 and the radially outward surface 184 of the annular collar 178. When the flow passages 180 are not obstructed by the split ring described below, the flow passages 180 permit damping fluid to flow between the region of the working chamber 132 above the annular collar 178 and the portion of the working chamber 132 between the annular collar 178 and the piston 138.

To provide means for accommodating the split ring described below, the annular collar 178 further comprises a groove 192. The groove 192 extending circumferentially around the radially outward surface of the annular collar 178. Further, the groove 192 extends through the radially outward surface 190 of the flow passages 180 as well as through the radially inward surface 188 of the flow passages 180 so as to form a circumferential ring seat 194. In addition, the groove 192 mates with an enlarged region 193 of the flow passage 180 so as to allow for minor misalignment of the flow passages 180 with the annular flow passage described below of the split ring 196.

To provide means for closing the flow passages 180 in response to displacement of said annular collar 178, the apparatus further comprises a split ring 196. The split ring 196 is operable to be inserted into the groove 192 and contains end portions 198 which are separated by a gap. The split ring 196 includes annular flow passage 200 which is operable to fluidly communicate with the flow passages 180 in the annular collar 178 when the split ring 196 is seated within the circumferential ring seat 194. The split ring 196 cooperates with an outwardly tapered portion 136 of the cylinder 130, which is disposed between a large diameter portion 204 of the cylinder 130 as well as a small diameter portion 208 of the cylinder 130. When the annular collar 178 is disposed approximate to the portion 208 of the cylinder 130, the split ring 196 is seated in the circumferential ring seat 194 so that the flow passage 200 in the split ring 196 fluidly communicates with the flow passages 180 in the annular collar 178. Accordingly, the apparatus 176 does not restrict movement of the piston 130.

As the annular collar 178 moves upward in the outwardly tapered portion 136 of the cylinder 130 so as to become proximate to the portion 204, the flow passages 180 in the annular collar 178 do not fluidly communicate with the annular flow passage 200 of the split ring 196 so that the flow of damping fluid through the flow passages 180 is obstructed. Accordingly, because damping fluid is unable to flow through the flow passages 180, the apparatus 176 restricts movement of the piston 138.

Obviously, many modifications and variations of the present invention are possible in light of the above teachings. It will be understood at the present invention may be used with other types of base valves, pistons, as well as other types of shock absorbers such as monotubular and monotubular with off-unit reserve chambers. Further, orifice size and configuration may vary, and the split ring and collar may be made of various sizes to obtain various valving characteristics. It is, therefore, to be understood that within the scope of the appended claims, the present invention may be practiced otherwise than as specifically described.

What is claimed is:

1. A shock absorber for damping the movement of the body of an automobile comprising:
   a pressure cylinder forming a working chamber operable to store damping fluid, said pressure cylinder having a tapered portion;
   a reciprocating piston disposed in said working chamber operable to divide said working chamber into first and second portions;
   an axially extending piston rod disposed in said working chamber and connected to said piston; and
   means for controlling the displacement of said piston being disposed on said piston rod at a position axially displaced from said reciprocating piston, said means for controlling the displacement of said piston comprising:
   a. an annular collar disposed on said piston rod, said annular collar having a plurality of flow passages operable to permit damping fluid to flow through said annular collar,
   b. a radially extending groove disposed on the periphery of said annular collar, said groove extending through said flow passages, and
   c. a split ring partially disposed within said groove and having at least one flow passage disposed therein, said split ring operable to control the flow of damping fluid through said flow passages in said annular collar in response to the position of said split ring with respect to said tapered portion, said split ring being single piece and having a first surface operable to engage said pressure cylinder, said first surface having a circular cross-section whereby the position of said split ring in said tapered portion of said pressure cylinder is operable to control the flow of damping fluid through said flow passage in said annular collar by controlling the position of said flow passage of said split ring with the flow passages of said annular collar.

2. The shock absorber of claim 1, wherein the position of said split ring in said tapered portion of said pressure cylinder being operable to control the flow of damping fluid through said flow passage in said annular collar by controlling the axial alignment of said flow passage of said split ring with the flow passages of said annular collar.

3. An apparatus for damping movement comprising:
a pressure cylinder forming a working chamber operable to store damping fluid, said pressure cylinder having a tapered portion;
a reciprocating piston disposed in said working chamber operable to divide said working chamber into first and second portions;
an axially extending piston rod disposed in said working chamber and connected to said piston;
an annular collar disposed on said piston rod, said annular collar having a radially extending groove disposed on the periphery thereof, said annular collar having a first flow passage extending through said groove, said annular collar being axially displaced from said reciprocating piston; and
closure means for closing said first flow passage in response to the position of said closure means with respect to said tapered portion of said pressure cylinder, said closure means being disposed within said groove in said annular collar and having a second flow passage, said closure means being single piece and having a first surface operable to engage said pressure cylinder, said first surface having a circular cross-section whereby the position of said closure means in said tapered portion of said pressure cylinder is operable to control the flow of damping fluid through said flow passage in said annular collar by controlling the position of said flow passage of said closure means with the flow passage of said annular collar.

4. The apparatus of claim 3, wherein said annular collar has a plurality of flow passages operable to permit damping fluid to flow through said annular collar.

5. The apparatus of claim 3, wherein said closure means comprises a split ring disposed within said annular groove.

6. The apparatus of claim 5, wherein said tapered portion has at least first and second diameters, said first flow passage in said annular collar fluidly communicating with said second flow passage in said split ring when said annular collar is proximate to said first diameter, said split ring obstructing the flow of damping fluid through said first flow passage in said collar when said annular collar is proximate to said second diameter.

7. A method for controlling the displacement of a piston in a shock absorber in which the piston is secured to a piston rod and is disposed within a pressure cylinder having a tapered portion, said method comprising the steps of:
disposing an annular collar on said piston rod at a position displaced from said piston, said annular collar having a radially extending groove disposed on the periphery of said annular collar, said annular collar having a first flow passage extending through said groove operable to permit damping fluid to flow therethrough upon movement of said annular collar;
disposing a split ring within said groove of said annular collar, said split ring having a second flow passage disposed therein, said split ring being single piece and having a first surface operable to engage said pressure cylinder, said first surface having a circular cross-section;
allowing damping fluid to flow through said first and second flow passages when said annular collar is disposed in a first region of said pressure cylinder, said first region having a first diameter;
moving said annular collar from said first region of said pressure cylinder to a second region of said pressure cylinder having a second diameter; and
obstructing the flow of damping fluid through said first flow passage by displacement of said split ring in said groove as said annular collar is moved from said first region of said pressure cylinder to said second region of said pressure cylinder whereby the position of said split ring in said tapered portion of said pressure cylinder being operable to control the flow damping fluid through said flow passage in said annular collar by controlling the position of said flow passage of said split ring with the flow passage of said annular collar.

8. The shock absorber of claim 7, wherein said first diameter of said pressure cylinder is less than said second diameter of said pressure cylinder.

9. The shock absorber of claim 7, wherein said first diameter of said pressure cylinder is greater than said second diameter of said pressure cylinder.

* * * * *

UNITED STATES PATENT AND TRADEMARK OFFICE
CERTIFICATE OF CORRECTION

PATENT NO. : 4,901,828

DATED : February 20, 1990

INVENTOR(S) : Robert J. Schmidt and Jerome J. Zawada, Jr.

It is certified that error appears in the above-identified patent and that said Letters Patent is hereby corrected as shown below:

On the title page:
Related application information, --This is a continuation of United States patent application Serial No. 170,821, filed March 21, 1988-- should appear on title page of patent;

Col. 1, Line 37, "guide rod" should be --rod guide--;

Col. 1, Line 51, "objection" should be --object--;

Col. 3, Line 27, delete "is" (second occurrence);

Col. 4, Line 38, "extending" should be --extends--;

Col. 5, Line 7, after "into", insert --the--;

Col. 5, Line 18, "guide rod" should be --rod guide--;

Col. 5, Line 44, "extending" should be --extends--.

Signed and Sealed this

Seventh Day of January, 1992

*Attest:*

HARRY F. MANBECK, JR.

*Attesting Officer*      *Commissioner of Patents and Trademarks*